United States Patent [19]

Mackles et al.

[11] Patent Number: 4,724,615
[45] Date of Patent: Feb. 16, 1988

[54] METERED DOSAGE SPOON

[75] Inventors: Leonard Mackles, New York, N.Y.; Leonard Chavkin, Bloomsbury, N.J.

[73] Assignee: Product Resources International, Inc., New York, N.Y.

[21] Appl. No.: 931,076

[22] Filed: Nov. 17, 1986

[51] Int. Cl.$^4$ .............................................. A47J 43/28
[52] U.S. Cl. ........................................ 30/326; 30/149; 222/192
[58] Field of Search .................. 222/192; 30/324, 326, 30/147–150; D7/137

[56] References Cited

U.S. PATENT DOCUMENTS

| | | | |
|---|---|---|---|
| 837,506 | 12/1906 | Raney | 30/326 |
| 847,942 | 3/1907 | Hohein | 30/326 |
| 1,474,443 | 6/1921 | Rhyne | 30/326 |
| 1,708,456 | 8/1928 | Tunick | 30/326 |
| 1,829,671 | 10/1931 | Ribera | 30/326 |
| 3,911,578 | 10/1975 | Ushkow | 30/326 |

Primary Examiner—Douglas D. Watts
Attorney, Agent, or Firm—Watson, Cole, Grindle & Watson

[57] ABSTRACT

A medicine spoon has a spoon bowl with a handle, and a flat cover completely covers the bowl in a closed position in which the cover bears against the edge of the bowl. The cover has a handle attached to the bowl handle for pivotal movement between the closed and open positions, and the cover has an opening through which an amount of a foam product from a dispenser may be fed to the bowl in the closed position of the cover. The underside of the cover scrapes along the upper edge of the bowl for wiping the underside clean during movement of the cover to its open position. Stop shoulders in the form of continuous flanges are provided on the bowl and cover for both limiting the cover to its completely closed position and for preventing leakage of product through the cover when filling.

8 Claims, 4 Drawing Figures

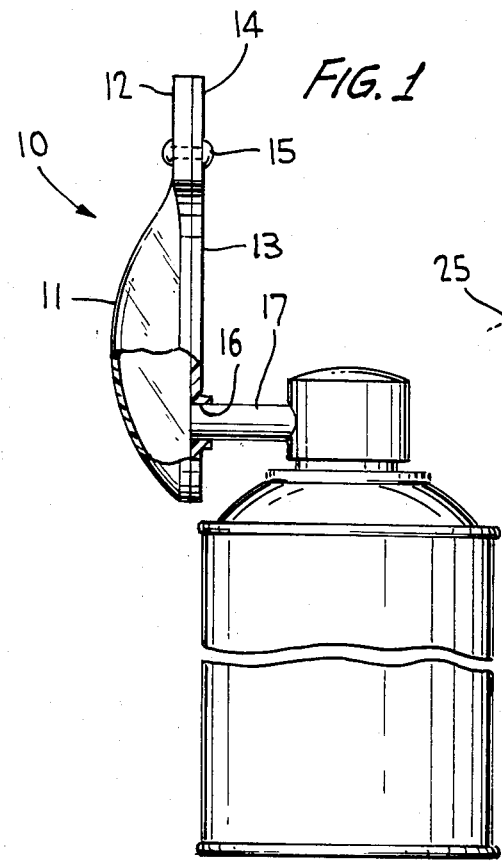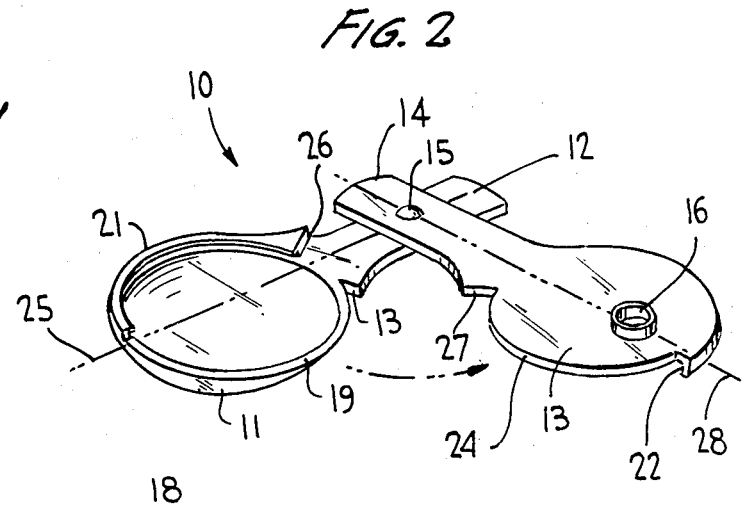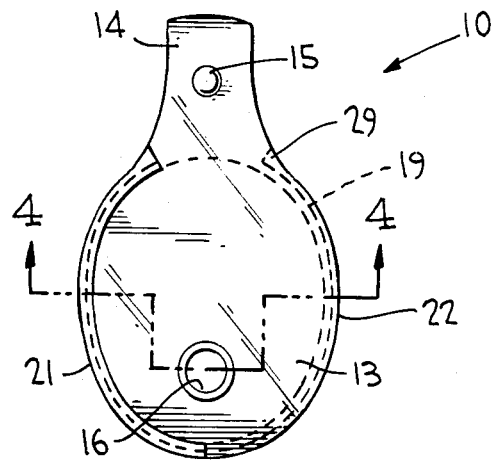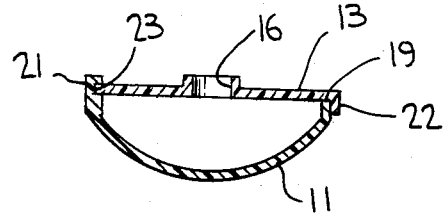

METERED DOSAGE SPOON

BACKGROUND OF THE INVENTION

This invention relates generally to a spoon which enables the user to meter a precise dosage of medicine, preferably a foamed product, fed the spoon bowl. More particularly, the spoon has a pivotally connected cover having an infeed hole through which the product is fed in a closed cover position after which the cover is swung open for spoon use.

Medicine spoons of various constructions have been devised to more easily administer medicines especially to medical patients or to children. For example, U.S. Pat. No. 1,474,443 discloses a spoon construction having a cover connected to the spoon in such manner as to be both pivoted and fulcrummed into open and closed positions. The cover is pivoted open to facilitate filling the spoon bowl with medicine, after which the cover is closed after and the spoon inserted into the patient's mouth. The handle of the cover is then depressed to cause the cover to fulcrum to open and the medicine to run from the spoon bowl.

However, such a spoon is incapable of being filled with a foamed medicant while the cover is closed for accurately measuring an amount of the medicant to be ingested by the user after the cover is swung open.

SUMMARY OF THE INVENTION

It is therefore an object of the present invention to provide a medicine spoon for accurately measuring an amount of foamed medicant by filling a spoon bowl through an opening in a pivotally mounted cover while the cover is in a closed position, whereafter the measured medicant may be ingested upon opening the cover.

More particularly, the spoon according to the invention may be of translucent or transparent material providing the user a quick visual indication of a filled spoon bowl as the discharge spout of a foam dispenser is extended into the hole located in the spoon cover when in its closed position. The cover is flat and bears against an edge of the bowl so as to completely cover the bowl in its closed position. The cover and bowl have short flat handles in overlying flat relationship interconnected solely for pivotal movement between closed and open cover positions about an axis perpendicular to the bowl handle. The underside of the cover scrapes along the edge of the bowl for wiping the underside during movement of the cover to its open position. And, the cover and the bowl have stop shoulders for limiting the cover in its fully closed position over the spoon bowl. The stop shoulders are continuous and extend partially along the peripheries of the cover and the bowl to avoid leakage during filling.

Other objects, advantages novel features of the invention will become more apparent from the following detailed description of the invention when taken in conjunction with the accompanying drawings.

BRIEF DESCRIPTION OF THE DRAWINGS

FIG. 1 is a side elevational view of the medicine spoon according to the invention, partly in section, shown mounted on the discharge spout of a foam dispenser for being filled with a foam medicant;

FIG. 2 is a perspective view of the spoon of FIG. 1 showing the cover in an open position;

FIG. 3 is a top plan view of the spoon of FIG. 1; and

FIG. 4 is a cross-sectional view taken substantially along the line 4—4 of FIG. 3.

DETAILED DESCRIPTION OF THE INVENTION

Turning now to the drawings wherein like reference characters refer to like and corresponding parts throughout the several views, the medicine spoon according to the invention is generally designated 10 in FIGS. 1, 2 and 3, and comprises a spoon bowl 11 of a given capacity such as a tablespoon, teaspoon, etc. The bowl has an integrally formed short handle 12 of flat construction. A flat cover 13 likewise has a short flat integral handle 14 which flatly overlies handle 12, the two handles being interconnected by a pivot pin 15 to facilitate only pivotal movement of the cover between the closed position of FIGS. 1, 3 and 4 and the open position of FIG. 2 about the axis of the pin which extends perpendicular to the handles. The cover has a single opening 16 sized to receive a discharge spout 17 of a foam dispenser 18 which may be an aerosol or a manually actuated pump foam dispenser.

In the completely closed position of FIGS. 1, 3 and 4, the cover bears against the entire edge 19 of the bowl. Stop shoulders 21 and 22, respectively on the bowl and the cover, cooperate to limit the cover to its completely closed position. Stop shoulder 21 on the bowl is in the form of a continuous flange having an undercut 23 (FIG. 4) which receives an edge 24 of the cover in its closed position. This flange extends from longitudinal axis 25 of the bowl and terminates at an angled end 26 approximately in the vicinity of handle 12. The cover has an undercut 27 at the junction with its handle 14 so as to mate with angled end 26 when the cover is closed.

Stop shoulder 22 on the cover is likewise in the form of a continuous flange extending from longitudinal axis 28 of the cover and terminating at an end 29 (FIG. 3). An undercut 31 at the juncture between bowl 11 and its handle 12 receives end 29 when the cover is closed. As shown in FIG. 4, shoulder or flange 22 extends around the outside of the bowl, and stop shoulder or flange 21 extends around edge 24 of the cover.

The cover and the bowl, or at least the cover, are of transparent or translucent plastic material.

In use, the empty spoon with its cover tightly closed is filled to capacity with a foam medicant via the discharge spout of the dispenser when inserted into opening 16 in the position shown in FIG. 1. On operation of the dispenser, the foam medicant completely fills the spoon bowl to the underside of the cover, which is made visible through the bowl and/or cover, whereupon the user simply ceases dispenser operation. The medicant which fills the spoon bowl is substantially prevented from leaking out through closed cover by the continuous flanges 21 and 22 which extend about almost the entirety of edge 19 of the bowl, and which likewise serve as stops assuring that the cover bears against edge 19 of the bowl in the closed position. The spoon bowl is therefore assured of being filled with a metered dosage of medicant. The cover is then moved to the open position of FIG. 2 in the direction of the arrow during which time the underside of the cover scrapes along edge 19 of the bowl for wiping the underside clean. The cover may be pivoted further to a position in which axes 25 and 28 coincide, such that the cover forms an extension of short handle 12 to be grasped by the user to facilitate easier handling of the spoon. The measured contents of the bowl may then be conveniently swallowed by the user.

After again closing the cover, the spoon use as aforedescribed may be repeated.

Obviously, many modifications and variations of the present invention may be practiced otherwise than specifically described. It is therefore to be understood that within the scope of the appended claims the invention may be practiced otherwise than as specifically described.

What is claimed is:

1. A spoon, comprising a spoon bowl having a flat handle, a flat cover completely covering said bowl in a closed position in which said cover bears against an edge of said bowl, said cover having a flat handle lying flatly against said bowl handle and attached thereto for pivotal movement between said closed position and an open cover position solely about an axis perpendicular to said bowl handle, said cover having stop means extending toward said bowl for bearing against said bowl in said closed position, and said cover having a single opening inwardly spaced from the outer periphery of the cover through which an amount of foam product may be fed to said bowl in said closed position, the underside of said cover scraping along said upper edge for wiping said underside during movement of said cover to said open position.

2. A spoon, comprising a spoon bowl having a flat handle, a flat cover completely covering said bowl in a closed position in which said cover bears against an edge of said bowl, said cover having a flat handle lying flatly against said bowl handle and attached thereto for pivotal movement between said closed position and an open cover position solely about an axis perpendicular to said bowl handle, said cover and said bowl having opposing stop means extending respectively toward one another for respectively bearing against said bowl and said cover in said closed position, and said cover having a single opening inwardly spaced from the outer periphery of the cover through which an amount of foam product may be fed to said bowl in said closed position, the underside of said cover scraping along said upper edge for wiping said underside during movement of said cover to said open position.

3. The spoon according to claim 1, wherein at least said cover is of transparent material.

4. The spoon according to claim 1, wherein at least said cover is of translucent material.

5. The spoon according to claim 1, wherein said cover and said bowl are of transparent material.

6. The spoon according to claim 1, wherein said cover and said bowl are of translucent material.

7. A spoon, comprising a spoon bowl having a flat handle, a flat cover completely covering said bowl in a closed position in which said cover bears against an edge of said bowl, said cover having a flat handle lying flatly against said bowl handle and attached thereto for pivotal movement between said closed position and an open cover position solely about an axis perpendicular to said bowl handle, said bowl having stop means extending toward said cover for bearing against said cover in said closed position, and said cover having a single opening inwardly spaced from the outer periphery of the cover through which an amount of foam product may be fed to said bowl in said closed position, the underside of said cover scraping along said uppe edge for wiping said underside during movement of said cover to said open position.

8. The spoon according to claim 2, wherein said stop means comprises continuous stop shoulders extending partially along said periphery of said cover and the periphery of said bowl.

* * * * *